INVENTOR.
Russell L. Stewart

United States Patent Office 3,586,613
Patented June 22, 1971

3,586,613
ELECTROLYTIC REDUCTION OF OXIDES USING PLASMA ELECTRODES
Russell L. Stewart, Midland, Mich., assignor to The Dow Chemical Company, Midland, Mich.
Filed Mar. 31, 1967, Ser. No. 627,436
Int. Cl. C22d 3/00, 3/12
U.S. Cl. 204—67
10 Claims

ABSTRACT OF THE DISCLOSURE

A method of reducing oxides of metals and metalloids using a gaseous plasma which forms an ionized gas anode as part of the electrolytic cell. The invention is applicable for the production of metals and metalloids which form oxides having a melting point lower than the boiling point of the metal or metalloid.

Figures 1, 2:
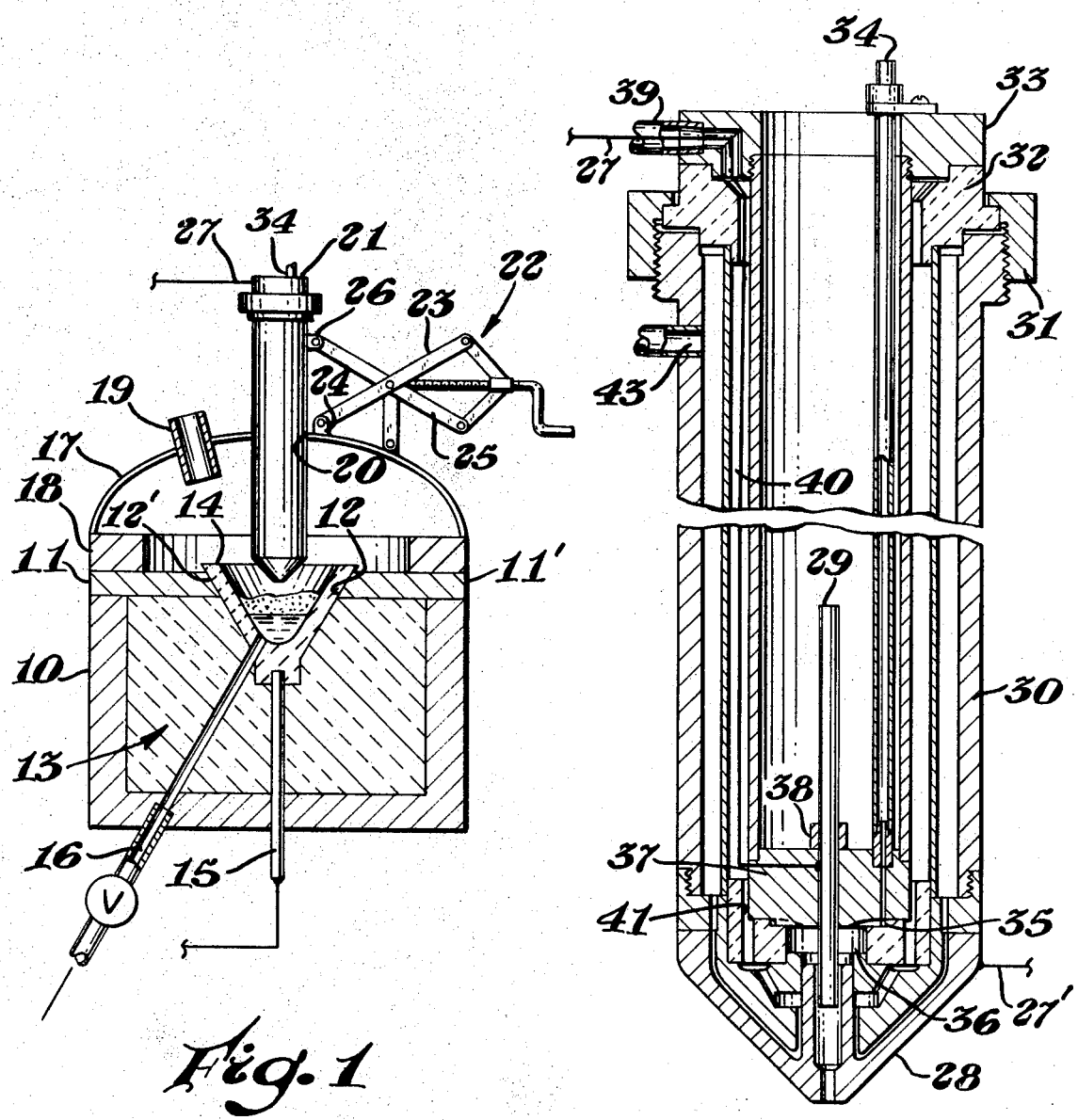

This invention relates to a method of reducing oxides of metals and metalloids whose melting points are lower than the boiling points of the respective elemental metals and metalloids by subjecting the oxides to the electrolytic action of a gaseous plasma jet anode formed by by passing an inert gas through a jet generator and to a non-contaminating cathode at a temperature sufficiently high to melt the oxide but below the boiling point of the element.

Electrolytic reduction of metal oxides using consumable electrodes is known. A typical example is the procedure used for reducing aluminum oxide which employs a carbon electrode in a molten mixture of cryolite and alumina. In this process the carbon is consumed in time, and during its consumption, it forms contaminants in the molten metal. All other known electrolytic processes for reducing metals and metalloids use anodes which are consumed through use and thus tend to contaminate the elemental metal or metalloid with components of the anode.

One of the advantages of the process of this invention is that very high purity elemental metal and metalloids can be obtained. Another advantage is that a single anode can serve for reducing oxides of a wide variety of metals and metalloids. Another advantage is that the atmosphere in the electrolytic cell can be readily controlled to avoid contamination from this source. A further advantage is that the containment vessel can be the pure oxide of the metal or metalloid. Yet another advantage is that the anode can be used for long periods of time with a wide variety of ionized gases, so that the temperature and reducing power of the plasma can be controlled over a wide range. Another advantage is that the process can be practiced in either batch or continuous operations.

In the drawings FIG. 1 is a vertical section of a furnace which can be used to practice the process of this invention and FIG. 2 is a broken vertical section of a plasma jet generating unit.

The process is operable for reducing any metal oxide or metalloid which melts at a temperature below that of the boiling point of the metal or metalloid, or which can be fluxed to melt below the boiling point of the element. Representative metals or metalloids which can be produced directly by reduction of their oxides using a plasma jet are aluminum, antimony, arsenic, beryllium, bismuth, boron, cerium, caesium, chromium, cobalt, copper, dysprosium, gallium, germanium, gold, hafnium, holmium, indium, iridium, iron, lanthanum, lead, manganese, mercury, molybdenum, neodymium, nickel, niobium, osmium, palladium, platinum, polonium, potassium, praseodymium, rhenium, rhodium, rubidicum, ruthenium, selenium, silicon, silver, tantalum, tellurium, thalluim, thorium, tin, titanium, tugnsten, uranium, vanadium, ytterbium, yttrium, zinc and zirconium.

It is to be understood that each oxide can have a different reducing temperature. This is readily controllable over a wide range by adjusting the amount of electrical power that is fed into the plasma jet forming electrode or by regulating the distance of the jet from the oxide.

Referring to the drawing, in FIG. 1, 10 is a wall of the bottom of the furnace, which serves merely as a containment vessel and can be made of any material which can withstand elevated temperatures, such as steel. The base has an inwardly projecting wall portion 11, tapered inwardly at 12, 12' which, with the walls 10, define a space 13 filled with an insulating material which can be any refractory material or the oxide to be reduced. Intermediate the wall portions 11, 11' is a crucible 14 which serves as a cathode and which can be of any high melting electrically conducting material including a solid column of the metal desired. In this instance it is made of graphite. The crucible is connected to an electrode 15 which in turn is connected to a source of electrical current. The crucible can contain a valved conduit 16 for draining liquid metal from the bottom. The top portion of the furnace 17 has a flange 18 around its periphery for seating on the inwardly projecting wall portion 11. A feed port 19 is provided in the top of the furnace for adding oxide to the crucible. An opening substantially in the center of top 17 has an opening 20, through which a plasma jet generator 21 is movably inserted. A scissor assembly 22 has one arm 23, connected to a lug 24 situated on the furnace top and the other arm 25 connected to a lug 26, which is attached to the plasma jet generator. The scissor assembly provides vertical movement for the plasma jet generator. Means for connecting the plasma generator to a source of electricity is shown at 27 and 27'.

The plasma jet generator of FIG. 2 has a front electrode 28 and a rear electrode 29. The front electrode is attached to a front electrode body 30, having a flange sleeve 31 which holds an insulating material 32, between the front electrode body and a rear electrode body 33. A gas inlet 34 enters the plasma jet generator through its top and terminates in a channel 35 which permits flow of the gas into chamber 36 where the gas contacts both the front and rear electrodes to form the plasma jet which is the anode in this system. The rear electrode is held in place by a sleeve 37 backed by a clamping device 38.

The generator is provided with cooling means whereby a cooling fluid enters a port 39, flows through inner conduit 40, through opening 41, through an outer conduit 42, and through an outlet 43.

In operating the plasma jet generator, a cooling medium such as water, is permitted to flow through the unit, an inert gas which can be helium, neon, xenon, krypton or nitrogen is permitted to enter the generator and a current of electricity is turned on the electrodes. As the inert gas passes the electrodes it is energized so that the jet emerging from the generator has the desired electrical conductivity to act as an anode for reducing the metal oxide in the crucible.

The electrical current flowing between the plasma jet (anode) through the molten material (electrolyte) in the crucible to the cathode effects the reduction of the oxide to form metal or metalloid which then serves as the cathode for the system.

It is to be understood that any other plasma jet generator capable of developing an anodic plasma and transfer power needed to reduce the metal oxide can be used in place of that described specifically herein, so long as the plasma jet serves as the anode, the containment vessel or crucible serves as the cathode and the molten ingredients in the crucible are sufficiently conductive to carry the electrolysis current between the cathode and anode.

For the purpose of brevity the invention is illustrated by the production of aluminum from a mixture of cryolite and alumina, although the oxides of the metals described above can be used. The employment of a flux to lower the melting temperature of the oxide-flux mixture is desirable for high melting products but is not absolutely essential. Where low melting oxides are employed, there is even less desirability for a flux.

EXAMPLE 1

The furnace described in the drawings was used for this test. A 500-gram charge of a mixture of 80 weight percent cryolite and 20 weight percent alumina was placed in crucible 14. The plasma jet was started, using argon as the inert gas and water as a coolant. A molten pool formed to transfer electricity from the anode to the crucible cathode. The power on the plasma generator was held in the range of 4–6 kw. and that of the transfer (crucible to front electrode) was held in the range of 5–6 kw. During the run an additional 2000 grams of the 80% cryolite-20% alumina mixture were added. The furnace was turned off after 300 ampere hours of power were consumed and the bath was allowed to cool. The aluminum metal in an amount of 10 g. was recovered as small spherical particles.

EXAMPLE 2

The procedure and equipment described in the preceding example were used. In this run the crucible was charged with 50 g. of aluminum and 500 grams of the 80% cryolite-20% alumina mixture before starting the argon plasma jet. Thereafter 2000 grams of the mixture were added gradually to the melt. After 450 ampere hours of electricity were consumed the power was cut off and the mixture allowed to cool. A total of 81.2 grams of aluminum metal were recovered.

I claim:
1. A method of reducing oxides of metals and metalloids whose melting points are lower than the boiling points of the respective elemental metals and metalloids comprising, subjecting said oxides to electrolytic action of a gaseous plasma anode formed by passing an inert gas through a plasma jet generator and a non-contaminating cathode at a temperature sufficiently high to melt said oxide but below the boiling point of the element formed on reduction of the oxide.
2. The method of claim 1 in which a low melting fluxing electrolyte is admixed with the oxide.
3. The method of claim 2 in which the electrolyte is cryolite and the oxide is alumina.
4. The method of claim 1 in which the inert gas is a noble gas.
5. The method of claim 4 in which the gas is argon.
6. The method of claim 4 in which the gas is neon.
7. The method of claim 4 in which the gas is krypton.
8. The method of claim 4 in which the gas is xenon.
9. The method of claim 1 in which the plasma jet generator is cooled with circulating water.
10. The method of claim 1 in which the reduction of the metal oxide is effected in a containment crucible of the metal oxide undergoing reduction and the cathode is the reduced metal.

References Cited

UNITED STATES PATENTS

| | | | |
|---|---|---|---|
| 1,254,531 | 1/1918 | Partanen | 204—66 |
| 2,768,061 | 10/1956 | Cook et al. | 204—164X |
| 3,004,137 | 10/1961 | Karlovitz | 204—64X |
| 3,203,883 | 8/1965 | Otatani et al. | 75—12X |

HOWARD S. WILLIAMS, Primary Examiner

D. R. VALENTINE, Assistant Examiner

U.S. Cl. X.R.

204—15, 64, 65, 66, 164